June 2, 1953     A. F. FLOURNOY     2,640,478

HEAT STORING COOKING UTENSIL
Filed Nov. 23, 1948

Inventor
Algernon F Flournoy

Patented June 2, 1953

2,640,478

UNITED STATES PATENT OFFICE 2,640,478

HEAT STORING COOKING UTENSIL

Algernon F. Flournoy, Shreveport, La., assignor, by decree of distribution, to Margaret Thurston Flournoy Application November 23, 1948, Serial No. 61,593

8 Claims. (Cl. 126—375)

My invention relates to cooking utensils generally, but particularly to a type of cooking utensil adapted to store up heat and dissipate the stored heat in a cooking operation.

The cooking utensil made according to the teaching of the herein described invention may be set upon a flame, brought up to the temperature sufficient to boil water, after which it may be set aside and the cooking operation be completed with the heat stored up in the cooking utensil incident to heating the cooking utensil up to the boiling point of water, 212 degrees Fahrenheit.

My invention is adapted to make use of heat storing compounds known to the prior art and heat storing compounds disclosed by me in my co-pending patent application, Serial No. 767,838, filed August 9, 1947, for Heat Storing Compound, now abandoned.

An object of my invention is to provide a cooking utensil with a compartment which is filled or partially filled with a heat storing compound which has a high latent heat of fusion and a melting point such that when the heat of a flame or other source of heat is conducted through the heat storing substance to bring water in the cooking vessel into a boiling condition, the heat storing substance will have melted, whereby the boiling point of water in the cooking vessel may be observed as an indication that the heat storing substance is approaching that temperature at which it changes into a molten state.

Another object of my invention is to provide a cooking utensil with a sealed enclosure at the bottom thereof which contains a measured quantity of heat storing substance, the quantity of heat stored by the heat storing substance being the measure of heat necessary to complete the cooking operation of food contained in the cooking utensil after the same has been brought to the boiling point of water and wherein the heat storing substance stores a sufficient surplus of heat to maintain the cooking vessel filled or partially filled with cooked food at a palatably hot eating temperature range for thirty minutes or more.

Another object of my invention is to provide a cooking utensil with a sealed enclosure which is filled or partially filled with a quantity of heat storing substance which has a melting point sufficient to maintain food in the cooking vessel portion of the cooking utensil at a cooking temperature range after the cooking utensil has been removed from the flame of a stove or other source of heat used to melt the heat storing substance, all of which cooking utensil and the heat storing substance contained therein is modified by the inclusion of a metallic heat conducting means which makes contact with the cooking compartment of the cooking vessel and which is embedded in the heat storing substance whereby the rate of flow of heat to the cooking vessel of the cooking utensil may be regulated by the heat conducting element which is preferably made out of aluminum on account of its high heat conductivity quality.

Another object of my invention is to provide in a cooking utensil having a compartment filled or partially filled with a heat storing substance having a high latent heat of fusion, a safety plug closing an opening in the compartment containing the heat storing substance to permit it to otherwise be completely sealed. The safety plug will be wholly or partially composed of a low melting point alloy which will melt and relieve the pressure in the compartment containing the heat storing substance if such is of a volatile nature and would build up a dangerous pressure when the cooking utensil was overheated for a considerable time and without any water being in the cooking vessel.

Other objects and advantages of my invention will be found in my following detailed description of a cooking utensil embodying my invention shown in my accompanying drawings, in which.

Figure 1:
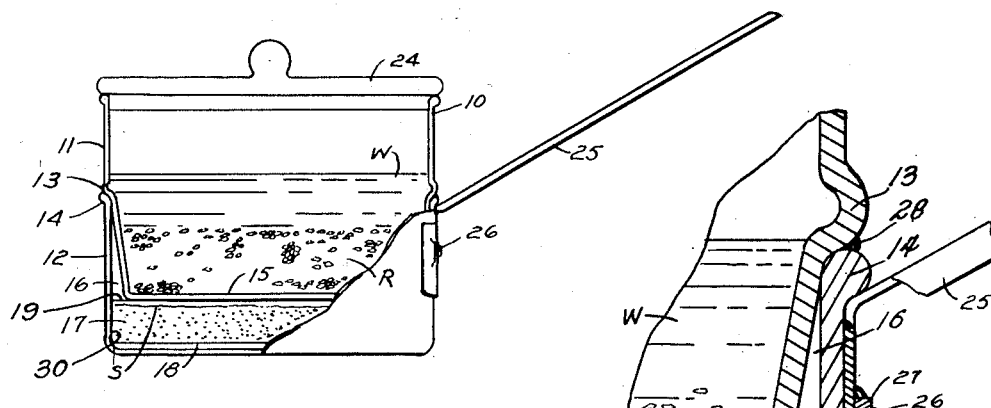
Figure 1 is a side elevational view in part cross section of a cooking utensil embodying my invention.

In the drawing, numeral 10 designates the cooking utensil generally which consists of the cooking vessel 11 and the lower container 12. The cooking vessel 11 has a peripherally disposed bead 13 formed in the side wall at a medial portion of its depth arranged to rest upon the upper rim surface 14 of the lower container 12. The lower side wall of the cooking vessel 11, below the bead 13, is made to taper inwardly of the lower container 12 and is integrally jointed to the bottom member 15. The bead 13 of the cooking vessel 11 may be soldered or welded to the upper rim 14 of the lower container 12 as represented at 28 to form an air-tight enclosure 16.

Within this enclosure 16, defined by the bottoms of the cooking vessel 11 and the lower container 12, I have placed a heat conducting element designated generally by numeral 17. The enclosure 16 constitutes a heat storing substance compartment. The heat conducting element 17 is more clearly shown in Fig. 3 and is provided with a bottom plate 18 arranged to lie flat in the bottom of the lower container 12. The plate 18 is provided with a number of radially disposed fins 19, the upper edges of which are adapted to contact the under side of the bottom 15 of the cooking vessel 11 and establish heat transfer relation therewith. The radially disposed fins 19 are preferably formed in the shape as illustrated in Fig. 4 which shows the lower end of the fin 19 formed as an integral part of the bottom plate 18 and extended upwardly to a thin upper edge 20.

Figure 3:
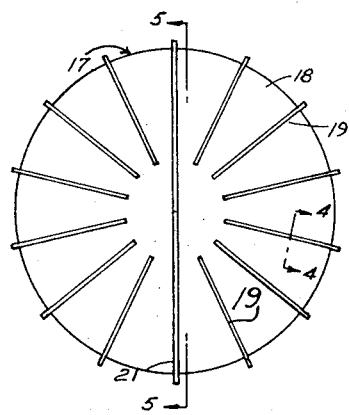
Fig. 3 is a top view of a heat conducting element as shown removed from its position in the lower enclosure of the utensil illustrated in Fig. 1.
Figure 4:
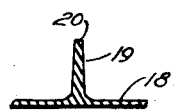
Fig. 4 is a broken sectional view of one of the heat conducting fins of the heat conducting element taken along line 4—4 of Fig. 3.
Figure 5:
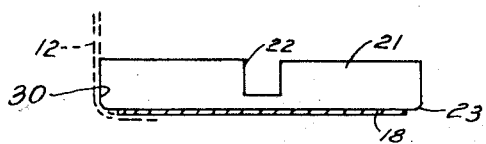
Fig. 5 is a sectional view taken substantially along line 5—5 of Fig. 3.

Figs. 3 and 5 show a single diametrically extended fin 21 extended across the bottom plate 18 and provided with a notch or recess 22 which permits the melted heat storing substance to settle to a uniform level throughout the enclosure 16 and embed the radially extended fins 19 and the diametrically extended fin 21. The notch or recess 22 is centrally located within the diametrically extending fin 21 and beneath the bottom of the upper container 11 and above the bottom of the lower container 12, and forms a passage for the heat storing substance when and if the substance reaches a condiction of fluidity for settling to the same level in the semi-circular areas occupied by the radially extending fins 19 on opposite sides of the diametrically extending fin 21. This diametrically extended fin 21 may be joined with other of the radially extended fins 19 to provide a radiating area at the center of the mass of heat storing substance.

Each of the radially extended fins 19 and the diametrically extended fin 21 extends beyond the circumferential edge of the bottom plate 18 and is provided with a curved portion 23 on its outer end adapted to contact an inside similarly rounded bottom corner portion of the interior of the wall 30 of the lower container 12 and establish heat transfer relation therewith. The radially extended fins 19 and the diametrically extended fin 21 also contact the interior surface of the vertically extending wall portion 30 of the lower container 12 and establish heat transfer relation therewith.

Due to the contact of the radially extended fins 19 and the diametrically extended fin 21 with the lower side wall portion of the lower vessel 12 and with the bottom of the same through the means of the bottom plate 18, heat may be conducted from a cooking flame or other source of heat directly to the bottom member 15 of the cooking vessel 11 to cook food contained therein. The same flows of heat also travel through the body of the heat storing substance S and heat the same.

During the process of the heating of the heat storing substance S only a fractional part of the flows of heat reaches the bottom member 15 of the cooking vessel 11, the major portion being used in bringing the temperature of the heat storing substance S up to its melting point and then melting it to accumulate a considerable quantity of latent heat called latent heat of fusion.

After the heat storing substance S has completely melted, its own temperature may then be raised at a far more rapid rate than during the melting of the same, and at such increased temperature the heat conducting fins, radially extended fins 19 and diametrically extended fins 21, supply heat to the bottom member 15 of the cooking vessel 11 at a greatly increased rate, a rate sufficient to boil water in the cooking vessel 11 or to carry the temperature still higher, if desired.

In the carrying out of the first object of this invention, a heat storing substance S having a melting point about 250 to 300 degrees Fahrenheit was used. The substance was nylon. It was found in experimenting that the use of the heat conducting element was needed when the nylon was used even though the nylon was mixed with substantially an equal volume of aluminum filings constituting also a heat conducting means. Where the heat conducting element 17 is used, it is unnecessary to use the aluminum filings or other heat conducting filings.

Figure 2:
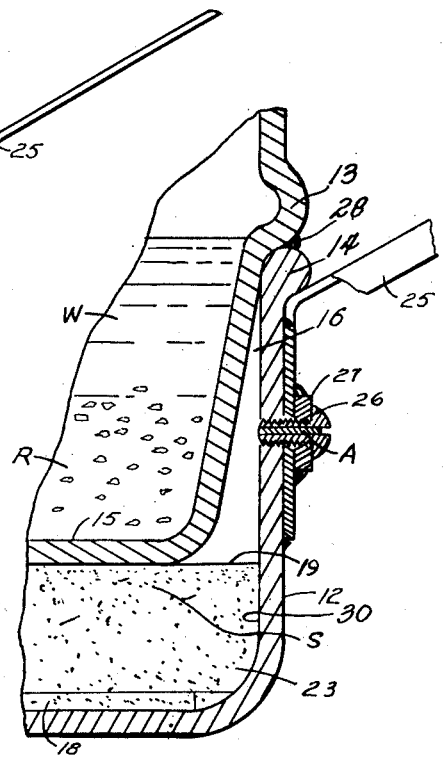
Fig. 2 is an enlarged sectional view of a safety plug element mounted in the side wall of the lower enclosure of the utensil illustrated in Fig. 1.

In Fig. 1 and Fig. 2 the level line of the heat storing substance S is below the under surface of the bottom member 15 of the cooking vessel 11. In this arrangement substantially all of the stored heat of the heat storing substance S that reaches the cooking vessel 11 is conducted to it through the heat conducting element 17. My invention is not limited to such a level of heat storing substance S. The level of the heat storing substance S may in some cases be itself brought into contact with the bottom member 15 of the cooking vessel 11. The substance nylon employed is one of the substances that could be brought into direct contact with the bottom member 15 of the cooking vessel 11 for the reason that the heat conductivity factor of the nylon is so low that its conductivity of heat would not upset the control of heat accomplished by means of the heat conducting element 17.

Since it is not necessary to maintain food at the boiling point of water in order to cook the same, I designed my cooking utensil to perform its cooking operation at a range of temperature from 212 degrees Fahrenheit at the start and thereafter under 212 degrees Fahrenheit. With this design of cooking utensil 10 the utensil did not dissipate the accumulated heat of the heat storing substance S in boiling away the water which, as everyone knows, requires lots of heat.

A cooking utensil 10 made according to my invention was tried out in cooking a cup of rice R mixed with two cups of water W with the glass top 24 in place. The cooking untensil 10 was set upon the stove and heated until you could see the water boiling, through the glass top, whereupon the utensil was set aside. The water continued to boil for not more than two or three minutes. However, the utensil remained at a cooking temperature for about twenty-five or thirty minutes longer. The utensil maintained the cooked rice at a palatable temperature for a period of twenty-five or thirty minutes longer. When the rice R was served, it was found to have been cooked so that the individual grains for the most part were separate from one another. I noticed also a feature that I had never encountered in the prior art methods of cooking rice. Whereas in prior art cooking methods some of the rice invariably stuck to the bottom of the cooking vessel, I found in using my cooking utensil the rice R did not stick at all either to the bottom 15 or the inner side walls of the cooking vessel 11. I attribute this advantageous feature of my cooking utensil 10 to the fact that the rice R is cooked at a decreasing temperature.

The cooking utensil 10 on several occasions was used to boil eggs. I found that where two or three eggs were placed in the cooking utensil 10 with the top 24 in place and the water W when brought to a vigorous boil, the cooking utensil could then be set aside with the top 24 on it and the eggs would become hard boiled. Where the top 24 was removed after the water W was brought to a vigorous boil and the utensil 10 set aside, the eggs would become soft boiled.

While I have described the cooking utensil 10 as being used only in connection with the cooking of rice and eggs, it is to be understood that its use is not to be limited to these two cooking operations. Where the cooking operation will require more heat than necessary to cook rice, the cooking utensil 10 is left on the fire for a longer time before it is removed in order to put into the food the extra amount of heat needed to cook the same.

The cooking utensil 10 is provided with a metal handle 25 which is welded or soldered to the lower container 12 as shown in Figure 2. The cooking vessel 11 is also welded or soldered to the lower container 12 after the heat conducting element 17 has been placed in the bottom of the lower container 12 and the proper amount of heat storing substance S has been added. During the welding of the cooking vessel 11, or the soldering thereof, to the lower container 12, the fuse plug 26 is removed to allow any gases that might accumulate due to the welding heat to escape so that no gas pressure is built up which could interfere with the welding or soldering operation.

The steel fuse plug 26 is cored and then filled with an alloy A, the melting point of which corresponds to a dangerous pressure which would result from overheating the cooking utensil 10 without any water W in it. When such a dangerous pressure is reached, the slug of alloy A melts and the gas is blown out through the core of the threaded screw type plug 26. The alloy A should melt at a temperature between 300 degrees Fahrenheit and 500 degrees Fahrenheit to make the utensil 10 perfectly safe under overheated conditions.

The last operation carried out in the making of the utensil 10 is the screwing down tightly of the fuse plug 26.

When the thickness of the handle 25 and the thickness of the lower container 12 provides an amply long threaded hole to permit the fuse plug 26 to be tightly screwed down, the threaded lug 27 shown in the drawing may be dispensed with. When a fuse plug 26 blows out, it is replaced by another fuse plug provided with an alloy core.

I have found that stainless steel vessels less than $\frac{1}{16}$ of an inch thick are admirably well suited to the making up of my cooking utensil 10 since they were so easily welded together. Aluminum vessels can be used, however, if desired.

Having thus described my invention, I claim:

1. A heat storing cooking utensil comprising a cooking vessel including an upper container and a lower container spaced therefrom, a heat storing substance compartment defined by the wall surface of the lower container of said cooking vessel and the bottoms of said upper and lower containers and a quantity of a heat storing substance in said heat storing substance compartment, said heat storing substance having a high latent heat of fusion and a melting point within the range of 250 to 300 degrees Fahrenheit, and a multiplicity of thermally conducting fins embedded in said heat storing substance and extending in heat transfer contact with the bottoms of both said upper and lower containers and the interior side walls of said lower container for conducting heat to said upper container.

2. A device as claimed in claim 1 wherein said heat storing substance compartment is extended under the bottom surface of the upper container of said cooking vessel and wherein said heat storing substance is distributed beneath the bottom of the upper container of said cooking vessel and between said thermally conducting fins.

3. A heat storing cooking utensil comprising a cooking vessel, including upper and lower containers each having bottom surfaces and with said lower container surrounding said upper container with the bottom surfaces spaced from each other, a heat storing substance compartment extended between the bottom surfaces of the upper and lower containers of said cooking vessel, a quantity of heat storing substance in said heat storing substance compartment distributed under the bottom of the upper container of said cooking vessel, a heat conducting means in said heat storing substance compartment comprising radially extending fins having a portion thereof embedded in said heat storing substance and a portion thereof disposed in heat transfer contact with the bottom surface of the upper container of said cooking vessel and having their terminating ends extending into heat transfer contact with the interior side walls of the lower container of said cooking vessel for directly conducting heat to said upper container.

4. A device as claimed in claim 3 wherein said heat conducting means includes one fin that extends diametrically of said vessel and a plurality of fins disposed on opposite sides of the diametrically extending fin and extending through said heat storing substance into heat transfer contact with the bottom of said upper container and the interior side walls of said lower container of said cooking vessel, whereby said heat conducting means serves as a means to conduct heat directly to the upper container of said cooking vessel while it is conducting heat into said quantity of heat storing substance.

5. A device as claimed in claim 3 wherein said radially extending fins are interconnected by an aluminum bottom plate and wherein said fins are formed from aluminum extended upwardly from said bottom plate a sufficient height to establish heat transfer relation with the bottom surface of the upper container of said cooking vessel when said bottom plate rests on the bottom surface of the lower container in said heat storing substance compartment, said bottom plate terminating short of the length of said fins.

6. A heating storing cooking utensil as set forth in claim 3 in which a diametrically extending fin is located intermediate said radially extending fins, said diametrically extending fin establishing heat transfer contact with the side walls of said lower container and with the bottoms of both said upper and lower containers and wherein said diametrically extending fin has the central upper portion thereof recessed to allow a movement of the heat storing substance from one side of said diametrically extending fin to the other side thereof under conditions where said heat storing substance may reach a condition of fluidity.

7. A device as claimed in claim 3 wherein said heat storing substance comprises a nylon plastic having a melting point between 250 degrees Fahrenheit and 300 degrees Fahrenheit.

8. A device as claimed in claim 3 wherein said heat storing substance comprises a mixture of a quantity of a nylon plastic having a melting point between 250 degree Fahrenheit and 300 degrees Fahrenheit with a quantity of aluminum filings from one half to one and a half times the volume of the nylon plastic.

ALGERNON F. FLOURNOY.

References Cited in the file of this patent

UNITED STATES PATENTS

| Number | Name | Date |
|---|---|---|
| 1,056,595 | Sheer | Mar. 18, 1913 |
| 1,412,717 | Stowell | Apr. 11, 1922 |
| 1,467,141 | Demuth | Sept. 4, 1923 |
| 1,609,134 | Sladky et al. | Nov. 30, 1926 |

FOREIGN PATENTS

| Number | Country | Date |
|---|---|---|
| 340,558 | Germany | Sept 13, 1921 |
| 42,449 | Norway | Feb. 8, 1926 |
| 162,695 | Switzerland | Sept. 1, 1933 |